May 25, 1954
A. DOVICA
2,679,095
SAFETY RAZOR
Filed Aug. 8, 1950
3 Sheets-Sheet 1
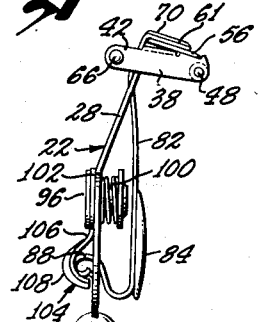
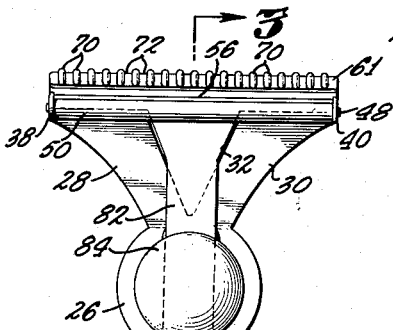
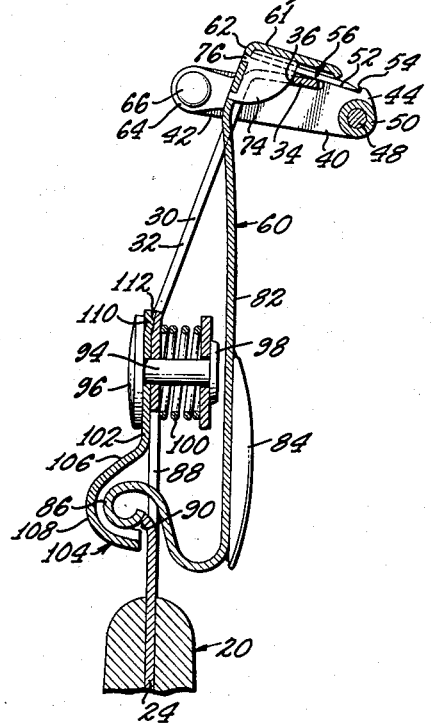
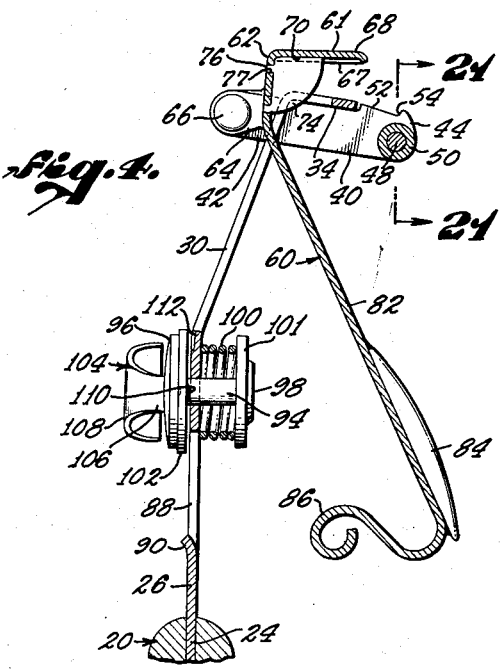
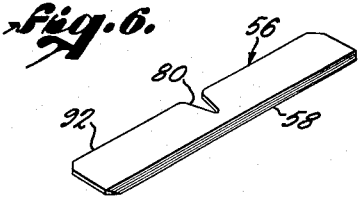
ANTHONY DOVICA,
INVENTOR.
BY Howard L. Johnson
ATTORNEY.

May 25, 1954 — A. DOVICA — 2,679,095
SAFETY RAZOR
Filed Aug. 8, 1950 — 3 Sheets-Sheet 2
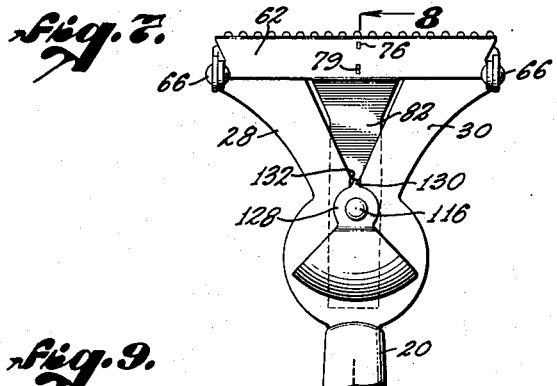
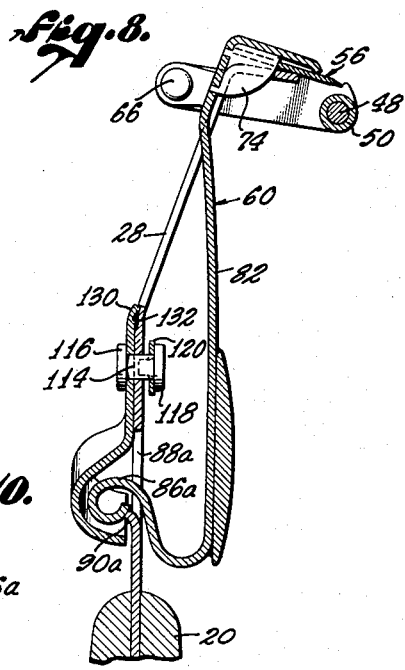
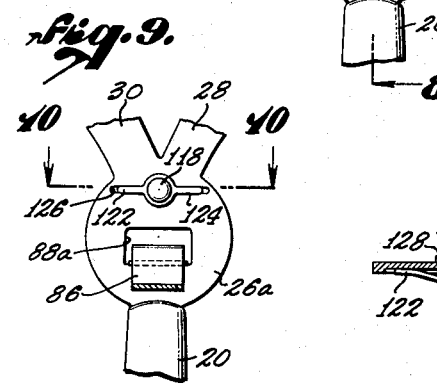
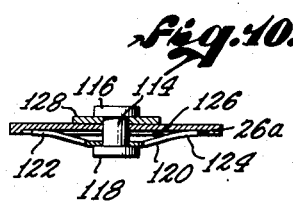
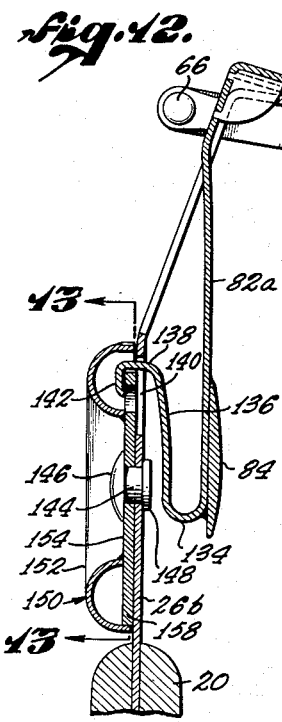
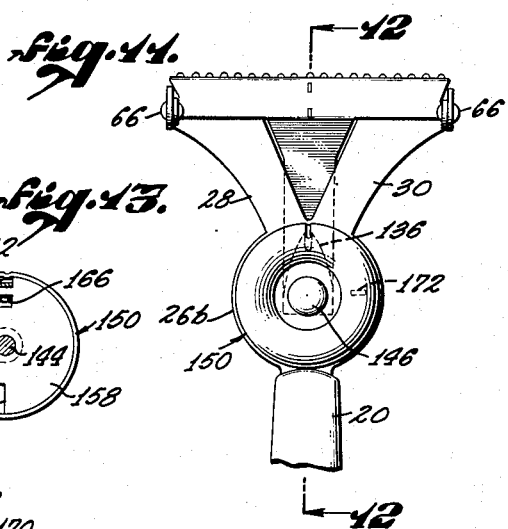
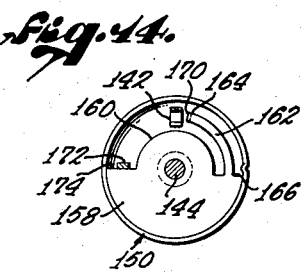
ANTHONY DOVICA, INVENTOR.
BY Howard L. Johnson
ATTORNEY.

May 25, 1954
A. DOVICA
2,679,095
SAFETY RAZOR
Filed Aug. 8, 1950
3 Sheets-Sheet 3
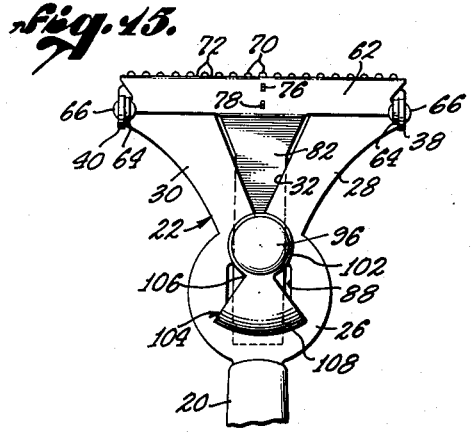
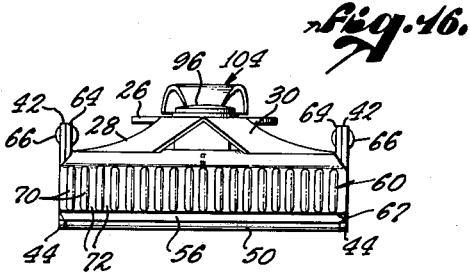
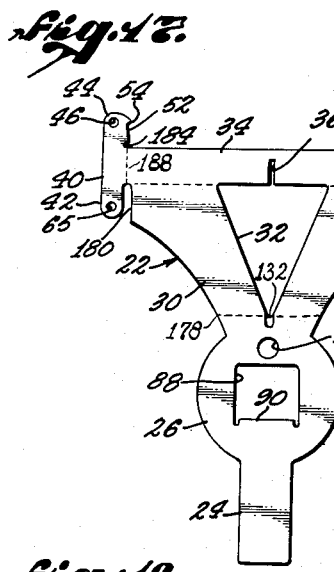
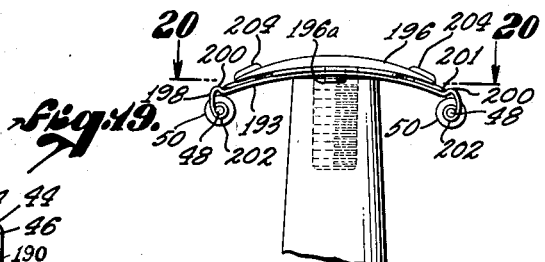
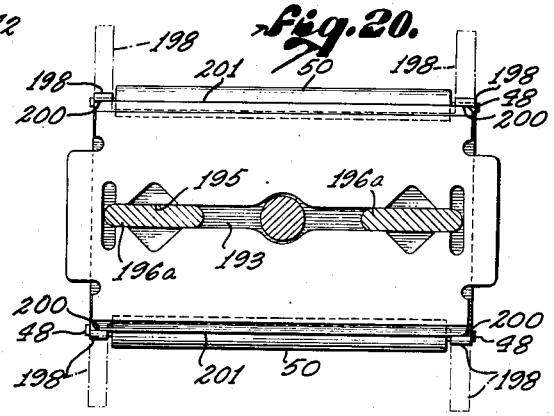
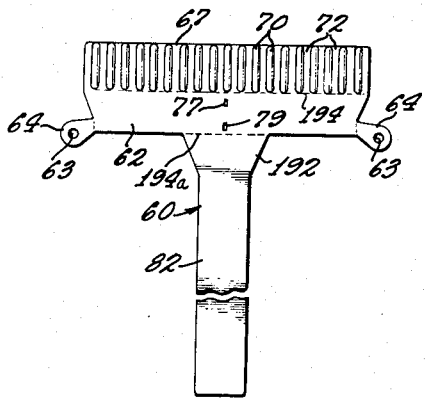
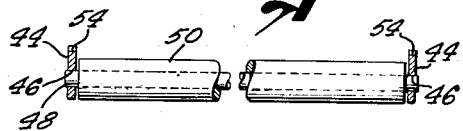
ANTHONY DOVICA,
INVENTOR.
BY Howard L. Johnson
ATTORNEY.

Patented May 25, 1954

2,679,095

UNITED STATES PATENT OFFICE 2,679,095

SAFETY RAZOR

Anthony Dovica, Los Angeles, Calif.

Application August 8, 1950, Serial No. 178,274

9 Claims. (Cl. 30—58)

This invention relates to new and improved razors and more particularly to that type of razor known as a safety razor by reason of inclusion of an interchangeable wafer-like blade which may be inserted and removed from the shaving head. My invention also provides a new single edged blade of the type described, which blade is particularly adapted for use with the present shaving head.

The objects of the invention include the provision of a shaving head which is provided with particularly effective means for reducing the sliding frictional contact between the non-blade portion of the razor and the face of the user.

Another purpose is to provide an improved shaving head which may be formed, in large part, from sheet metal by stamping and bending the same.

Still other features of the invention reside in the provision of a lever-operated hood member for the shaving head, of spring engagement means for securing the lever arm in a quickly releasable position, and of guard means adapted to protect the engaged lever from accidental displacement.

Yet another object is to provide new and improved means for aligning and holding a blade in a safety-razor.

It is within the province of the disclosure to improve generally, and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the drawings which form part of the present specification:

Figure 1 is a side elevational view of a razor constructed according to my present invention and shown in closed position with a blade held in place for use.

Figure 2 is a front elevational view of the razor of Figure 1.

Figure 3 is a longitudinal sectional view taken thru the upper part of the razor with parts shown in elevation, the shaving head being closed on the blade.

Figure 4 is a view corresponding to Figure 3 but with the shaving head in open position and the blade removed therefrom.

Figure 5 is an enlarged side view of the guide fin of the movable hood member, shown by itself.

Figure 6 is a perspective view of a single edged razor blade particularly adapted for use in the razor of Figures 1 to 4.

Figure 7 is a rear elevational view of a shaving head which is constructed with a somewhat different form of guard member.

Figure 8 is a longitudinal sectional view taken thru the shaving head of Figure 7 along the line 8—8.

Figure 9 is a fragmental view showing in elevation, the reverse face of the razor of Figure 7.

Figure 10 is a horizontal sectional view taken along the line 10—10 of Figure 9 and particularly showing the spring tensioning means of the guard member.

Figure 11 is a rear elevational view of a shaving head which is provided with still another type of guard and locking device.

Figure 12 is a longitudinal sectional view taken thru the shaving head of Figure 11 along the line 12—12.

Figure 13 is an inner elevational view of the locking device of Figures 11-12 as seen along the line 13—13, and shown in locked position.

Figure 14 is a similar view of the preceding device in unlocked position.

Figure 15 is a rear elevational view of the assembled razor.

Figure 16 is a top plan view of the same.

Figure 17 is a plan view of the stationary piece of my shaving head shown after it has been stamped out of sheet metal and before bending.

Figure 18 is a similar view of the movable or cover piece of my shaving head shown after the face contacting ribs or corrugations have been formed therein and before other bending.

Figure 19 is a side elevational view of a double edge blade type of safety razor showing a novel construction of the lower head member by which my friction reducing roller is mounted.

Figure 20 is a top plan view of the razor of Figure 19 with the cover removed, as seen along the line 20—20, with parts in transverse section.

Figure 21 is a side elevational view of my friction reducing roller shown mounted between opposing side wings which are seen in cross section.

Having particular reference to the embodiments of Figures 1 to 4, my razor is constructed of a generally elongated handle portion 20 and an upper head portion 22, which latter carries a dependent shank 24 inserted in the handle or otherwise suitably secured thereto. Projecting upward from the shank is a generally annular disk section 26 from the upper edge of which extend a pair of outwardly diverging arms 28, 30 which are bent forward (in relation to the upright disk 26 and shank 24) to describe the sides of a generally triangular cutout or opening 32 therebetween. Along the upper edge of the triangular cutout 32, the two arms 28, 30 are bent downward and forward at approximately right angles to form a flat supporting ledge 34. This ledge extends across the whole width of the head and has a transverse slot 36 cut forward partway across its center from the rear edge thereof.

Each end of the supporting ledge is provided with a turned down wing 38, 40, which wings are disposed generally parallel to each other and transverse to the longitudinal axis of the head. It will be observed that the lateral wings extend beyond the edges of the supporting ledge 34 both to the rear, where the extensions 42 form a hinge mounting (as will be more fully described hereafter) and to the front. The forward extensions 44 are transversely apertured at 46 so as to journal jointly therein, the mounting pin 48 of a face-contacting or friction-reducing roller 50, the outer surface of the cylindrical roller being disposed substantially flush with (or extending beyond) the corresponding edge of each forward extension 44.

To facilitate mounting and removal of the roller 50 between the bearing ears 44, the pin 48 may be longitudinally displaceable within the roller. Consequently in assembly the roller by itself may first be located between the aligned openings 46 and the pin then inserted jointly therethru. By reason of this construction, it is possible also to adjust the distance between the shaving edge of the blade, and the roller. Since this distance is also a measure of the minimum displacement of the blade from the shaver's skin or of the "closeness" of a shave which one may obtain, it can be controlled or varied by use of interchangeable rollers of different outer diameter. Accordingly with a small roller one obtains a close shave, while with a larger roller one gets a coarse shave. And with the displaceable pin 48 mounting, one may simply push the pin out of one aperture 46 with a pencil or the like, swing out the corresponding end of the roller and then withdraw the projecting pin and roller jointly from the opposite bearing ear 44. Another roller of different diameter can then be inserted with equal ease.

The upper edge of each side arm 38, 40 forward of the ledge 34 is formed with a somewhat more downward inclined slant 52 than the ledge itself, and it terminates forward in an upwardly directed abutting shoulder or notch 54. The edge 52 and notch 54 of the opposing side wings 38, 40 are thus jointly adapted to align by contact therewith, a single edged blade 56 (Figure 6) the cutting edge 58 of which is disposed to abut at either end against the respective notches 54.

To accommodate the present blade, as well as to promote friction reducing contact with the shaver's skin, the shaving head is characterized by a two piece construction. The movable member 60 of the head is formed of a generally inverted-L or hoe-shaped hood 61, the upright or backing portion 62 of which is rectangular and of somewhat less length than the collective span of the two supporting arms 28, 30. A turned back ear 64 is disposed along each lower corner thereof. In assembly the ears are disposed in juxtaposition with the corresponding inner faces of the respective rearward extensions 42 of the side wings and are rotatably connected thereto by a hinge pin or rivet 66.

The forward or cover portion 67 of the movable hood generally overlies the blade-supporting ledge 34. Its upper or outward face 68 is formed with a longitudinal series of transversely directed alternating ribs and grooves 70, 72 respectively, of generally equal width, the ribs being adapted to contact the skin of the shaver so as to reduce the sliding friction of the shaving head therealong. Mounted along the under face of the hood by insertion in the centermost groove thereof, is a transversely disposed fin 74 having a pair of backwardly extending lugs 76, 78 (Figure 5) which are received in corresponding apertures 77, 79 (Figures 7, 11) formed in the rear portion 62 of the hood, the lugs being retained therein by being press fit, soldered or the like. Upon pivoting of the moveable head portion 60 upon the pins 66, the guide fin 74 is disposed to move within the groove 36 of the supporting ledge 34 and within a corresponding notch 80 cut inward from the rear or blunt edge of my blade Figure 6. The fin thus serves by frictional contact with its sides, to mutually align the supporting shelf 34 (or stationary part of the head), the blade 56, and the hood member 61 (or moveable part of the head).

Extending downward from the back 62 of the hood and bent angularly outwardly so as to project forward thru the opening 32 between the supporting arms 28, 30 is a dependent lever arm 82 carrying on its lower end a generally disk-shaped thumb piece 84 and being then bent back to form a rearward projecting, resilient engaging hook 86. The opposite disk portion 26 of the stationary part of the head 22 is formed with a more-or-less central aperture 88 having a turned-back, lower engaging lip 90. Upon placing a blade 56 upon the supporting ledge 34 and pressing the thumb piece 84 in a rearward direction, the spring hook 86 is pressed thru the aperture 88 and beyond the engaging lip 90 so as to overlie the same. In this position the hood member 67 is clamped down upon the blade 56 so that the ends of its forward blade edge 58 being lodged in the respective notches 54 of the lateral wings 38, 40, and its lower face being held in frictional engagement with the positioning edges 52, the blade will be held securely in shaving position with its rear edge 92 extending toward the inner face of the back 62 of the moveable head but not necessarily touching the same.

Locking means are provided against accidental displacement of the engaging hook 86 from the disk aperture 88. For this purpose a transverse pivot pin 94 is mounted in a corresponding aperture of the upper portion of the stationary disk 26, bearing on opposite ends thereof enlarged head members 96, 98. Between the rear pin head 98 and the rear face of the disk section 26 there is disposed about the shank of the pin 94 a helical expansion spring 100, which may be anchored by a plate 101. Adjacent the opposite face of the disk 26 the pin carries a rotatable washer 102 having a dependent guard member 104 extending outward therefrom. The guard member is formed with a neck portion 106 which is bent upward into a generally semi-circular shield 108 which at its further edges is laterally extended or flared on each side beyond the thickness of the neck.

It will be apparent accordingly that the shield 108 can be swung from one side to the other upon the pin 94 so as to expose the engaging hook 86 from the rear of the razor and to allow it to be pressed out of its socket or aperture 88. However for locking it in its closed or covered position, the plate 102 is formed with an inwardly pressed dimple 110 (Figure 3) adjacent its upper edge, which dimple in such position is received in a corresponding socket or depression 112 of the disk 26. Accordingly it will be seen that the expansion spring 100 serves to hold the pin 94 in its innermost position and thus retain the locking dimple 110 in its socket, consequently preventing lateral movement of the dependant shield 108. Accordingly it will require a definite lateral pressure upon the shield, in one direction or the other, to dislodge the plate 102 from its engaging position, thus turning the same on the mounting pin 104 and exposing the spring hook 86 for manual ejection.

Another method of mounting the guard member 104 is particularly illustrated in Figures 7 to 10. In this embodiment a mounting pin 114 is provided with opposing flanged head members 116, 118 on opposite ends. A transversely or horizontally directed resilient member or leaf spring 120 (Figure 10) is located upon the mounting pin adjacent its inner head 118, the spring being formed with a finger 122, 124 upon each end thereof and disposed in a correspondingly directed transverse groove 126 extending along the inner face of the disk 26a. In this case the mounting annulus 128 of the guard member which surrounds the mounting pin 114, is provided with a downwardly bent, lateral projection 130 (Figures 7, 8) which is received in an inwardly directed channel 132 formed at the intersection of the supporting arms 28, 30, the pressure of the leaf spring 120 upon the pin head 118 serving to draw the tit or projection 130 into the socket 132. Accordingly again some little force will be required to push the guard member to either side in order to expose the spring hook 86 so that it can be displaced from abutment with the engaging lip 90a and ejected from the aperture 88a.

Still another construction for a locking engagement of a lever arm 82a is illustrated in Figures 11–14. The lever arm adjacent the lower edge of the thumb piece 84 is bent into a U curve 134, the free arm of which 136 extends upward to a correspondingly inverted U or hook-shaped terminus 138. The hook extends thru an aperture 140 near the upper margin of the disk 26b and carries a turned down engaging end 142 overlying the rear face of the disk. By means of a central mounting pin 144 disposed in a transverse opening of the disk 26b and provided with opposing head members 146, 148 upon its opposite ends, there is rotatably mounted a circular guard member 150, the outer face 152 of which is substantially doughnut shaped, with a central depressed area 154 engaged by the overlying rivet head 146, and the body of the "doughnut" being substantially semi-circular in cross section.

The flat rear wall 158 of the guard member is constructed with a semi-annular cut out portion 160, part way around which extends an arcuate engaging finger 162 centered in the open space, coplanar with the wall 158 and having a free end 164 from which it curves back to its junction with the wall proper at 166. Upon insertion of the hook 142 thru the aperture 140 and rotation of the guard member, the guard finger 162 is adapted to pass between the hook end 142 and its insertion aperture (Figure 12) so as to hold the hook against withdrawal therefrom. Accordingly the finger 162 could be turned within the hook 142 until the latter abutted against the end wall 166.

At the free end 164 of the finger there is a turned up abutment lip or hook 170 (Figure 14) which also engages the spring hook 142 so that in order to release the latter at this point, the thumb piece 84 must first be pressed inward and finger 162 then rotated free. Further there is provided a stop member 172 (Figure 11) mounted upon the face of the stationary disk 26b and extending into the cutout portion of the doughnut so as to limit the movement of the latter by contact of the further edge 174 of the cutout thereagainst. In this manner a limit is placed on the "unlocking" or counterclockwise turning of the guard 156. Since the natural resilience of the metal lever arm 82a will normally draw it to the right as viewed in Figure 12, the thumb piece 84 will have to be pushed inward (i. e. to the left) in both fastening and unfastening the movable hood or its dependent arm 82a.

The manner in which the two parts of the shaving head may be formed from sheet metal is particularly illustrated in Figures 17, 18. Figure 17 shows the stationary portion of the head 22 after it has been stamped out of a flat piece of metal and before it has been bent. It will be observed that the shank 24 and adjacent disk 26 are the only two parts which will still remain unbent in the assembled shaving head. However, the engaging lip 90 which is formed in the opening 88 is peened over to provide more of an abutment for the hook 86 (Figures 3–4). From the disk area there is also punched out the mounting aperture 176 for the pivot pin 94.

Above the disk 26, the triangular section 32 is cut out to form the supporting arms 28, 30 which may later be bent forward a small amount along the line 178. At the same time the groove 132 is formed and the slot 36 is made in the blade-supporting shelf 34 to allow movement of the guide fin 74 therealong.

Simultaneously with formation of the lateral wings 38, 40 there is cut away a parallel slot 180, 182 between each wing and the adjacent arm so as to provide clearance between the two in their later bent position. A small notch 184 is also formed at the junction of the supporting ledge 34 with each forward guide edge 52 of the wings in order to align each edge 52 with the ledge 34 when bent. At the same time, the roller apertures 46 and the rivet or hinge openings 55 are punched out. Accordingly the blade ledge 34 may now be turned down along the line 186 and the wings bent over along the lines 188, 190.

The movable member 60 of the shaving head may be similarly stamped out of sheet metal (Figure 18) and subsequently bent for attachment to the stationary piece of Figure 17. The lever arm 82 is formed with an angularly diverging throat portion 192 which joins the rear wall 62 of the hood to the lever arm proper. The rear wall has two more-or-less rectangular openings 77, 79 cut out along the midline thereof for reception of the lugs 76, 78 of the inner guide fin (Figure 5); and in addition the bearing ears 64 are formed integral therewith, with their apertures 63 punched out. The bearing ears are subsequently bent back so as to lie in juxtaposition wtih the apertured wing ends 42 (Figure 16) and to receive a hinge pin or rivet 66 jointly therethru.

At the same time that the movable member 60 is stamped out, the cover 67 may have the friction-reducing ribs 70 pressed into it from beneath. In the same or a subsequent operation, the head is bent along the lines 194, 194a and the free end of the lever 82 is then bent into an engagement hook (Figure 4 or 12). The thumb piece 84 is soldered or otherwise attached to the lever as desired.

It will be observed that by the foregoing construction, the conventional rake-type guard member is eliminated and its place taken by my friction-reducing roller 50. Altho my invention is particularly embodied in shaving heads for single edged blades, by the construction of Figures 19-20 however, my roller, and in particular my interchangeable rollers of different sizes, can be used also with shaving heads adapted to employ double edged blades. For use with a conventional "Gillette-type" razor and blades, there is provided a lower blade-supporting member 193 having the usual keyed openings 195 for reception of an aligning rib 196a of the cover member 196. Each corner of the blade support however is provided with a mutually parallel, outward extension 198, which if stamped out of sheet metal might be termed a ribbon. Each strip 198 is bent sharply upward at 200 to form an abutment for the blade edge 201 similar to the notch 54 (Figures 3-4), and is then curved downward and turned upon itself to form a loop 202. This loop serves as a socket or bearing mounting for the displaceable pin 48 of my face contacting roller 50. In addition, transverse, friction reducing ribs 204 may be provided along the top surface of the cover to cooperate with the rollers in producing a less irritating and smoother shave.

While I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

The invention having been herein described, what I claim as new and desire to secure by Letters Patent is:

1. In a two-piece shaving head comprising in combination: upper and lower blade-engaging members hingedly connected along a longitudinal edge thereof and adapted to frictionally contact opposite sides of a blade, the upper member having a generally flat surface being formed with a longitudinal series of transverse friction-reducing face-engaging ribs laterally spaced apart and extending upwardly from said surface; and a face contacting replaceable roller carried by said lower member and having its circumferential periphery spaced downwardly from and laterally adjacent an operative cutting edge of the blade, said parts being so proportioned, aligned and arranged that said roller and said ribs normally engage the user's body to set and define the depth of the effective shaving edge said replaceable roller comprising a face-contacting cylindrical sleeve and a longitudinally displaceable bearing pin having a press fit in said sleeve but being capable of axial displacement in said sleeve by endwise pressure upon an end thereof, the ends of the pin projecting beyond the corresponding ends of the sleeve, said lower member having parallel arm portions defining journal openings therethrough for the rotatable securement of said roller by means of said ends of said pin, said ends of said pin extending beyond said arm portions through said journal openings and being retractable through a selected journal opening by said endwise pressure to free the roller from said shaving head whereby rollers of different diameter and corresponding construction may be interchanged in said shaving head.

2. A shaving head comprising in combination: an upright supporting member having an opening therethru; blade-supporting means carried by said member; a cover hingedly mounted adjacent and spaced rearwardly of the main body of the top of said member so as to overlie the blade-supporting means; an operating lever extending thru the opening of said supporting member and integrally and substantially non-yieldably connected to said cover at its upper end to give a mechanical advantage to said lever relative to said cover; and lever engaging means carried by the upright member adjacent the lower end of the lever, whereby the cover and blade-supporting means may be held by means of said lever against opposing faces of a blade.

3. The shaving head of claim 2 wherein the lower arm of said lever has an operating advantage of at least 2 and wherein the end of said lever carries resilient engaging means and said upright member is additionally apertured adjacent said engaging means so as to receive the same therethru in locking relation.

4. A shaving head comprising in combination: an upright supporting member having an aperture therein: a pair of diverging arms extending upward from said supporting member; a blade-supporting shelf extending forward jointly from the top edges of said arms; a pair of generally parallel upright wings disposed along opposite sides of said shelf and projecting to the front and rear of the same, which wings have guide means along their forward projections for aligning a blade by contact therewith; a hoe shaped member swingably mounted between the rear extensions of said wings and consisting of a hood portion adapted in a downswing position to frictionally overlie a blade when the latter is carried on said shelf, and a dependent lever portion extending forward between said diverging arms and carrying adjacent its lower end a thumb piece and spring engaging means which means are adapted to be releasably received in the aperture of said member, and a rotatable guard member mounted along the rear of said supporting member so as to overlie the aperture thereof and adapted to be moved manually between positions which respectively guard the engaging means against displacement from said aperture and permit the manual ejection of the engaging means from the aperture, thereby raising said hood by action of the lever.

5. A shaving head comprising in combination: an apertured disk disposed in a generally upright position; a pair of diverging arms extending upward from an edge of the disk; a blade-supporting shelf extending forward jointly from the top edges of said arms; a pair of generally parallel upright wings disposed along opposite sides of said shelf and projecting to the front and rear of the same, which wings have guide means along their forward projections for aligning a blade by contact therewith; a hoe shaped member swingably mounted between the rear extensions of said wings and consisting of a hood portion adapted in a downswung position to frictionally overlie a blade when the latter is carried on said shelf, and a dependent lever portion extending forward between said diverging arms and carrying adjacent its lower end a thumb piece and spring engaging means which means are adapted to be releasably received in the aperture of said disk; and a rotatable guard member mounted along the rear face of said disk so as to overlie the aperture thereof and adapted to be moved manually between positions which respectively guard the engaging means against displacement from said aperture and permit the manual ejection of the engaging means from the aperture, thereby raising said hood by action of the lever.

6. A safety razor comprising in combination, connected handle and head portions, which head portion includes: an apertured disk supported in a generally upright position by said handle; a pair of diverging arms extending upward from an edge of the disk opposite said handle; a blade-supporting shelf extending forward jointly from the top edges of said arms, which shelf has a transverse aligning slot cut partway thru the same from its rear edge; a pair of generally parallel upright wings disposed along opposite sides of said shelf and projecting to the front and rear of the same, which wings have guide means along their forward projections for aligning a blade by contact therewith; a face-contacting roller mounted between the forward extensions of said wings; a hoe shaped member swingably mounted between the rear extensions of said wings and consisting of a hood portion adapted in a downswing position to frictionally overlie a blade when the latter is carried on said shelf, said hood having a transverse fin adapted to be received in said aligning slot, and a dependent lever portion extending forward between said diverging arms and carrying adjacent its lower end a thumb piece and spring engaging means, which means are adapted to be releasably received in the aperture of said disk, the upper face of the hood which overlies the blade being formed with a longitudinal series of friction-reducing face-engaging ribs laterally spaced apart and disposed generally parallel to said wings; and a rotatable guard member mounted along the rear face of said disk so as to overlie the aperture thereof and adapted to be moved manually between positions which respectively guard the engaging means against displacement from said aperture and permit the manual ejection of the engaging means from the aperture, thereby raising said hood by action of the lever.

7. A two-piece shaving head formed essentially of sheet metal by stamping and bending the same, one of said pieces being a stationary piece and consisting of an apertured disk adapted in use to be located in an upright position, a pair of diverging arms extending upward from an edge of said disk and defining a generally triangular cut-out portion therebetween, a transverse blade-supporting shelf bent forward from the upper edge of said arms, a pair of generally parallel wings bent downward along opposite sides of said shelf and projecting outward beyond the front and back thereof; the other of said pieces being adapted for hinged connection to said stationary piece and consisting of an angularly bent cover member adapted to overlie said shelf and having turned-back bearing ears adapted to be pivotally connected to and disposed in juxtaposition with the rear projecting portions of said wings, and a dependent lever arm extending centrally downward from the rear edge of said cover so as to be insertable thru said triangular cut-out, the lower end of said lever being bent into an engaging element for insertion thru said disk aperture.

8. A shaving head comprising in combination: an upright supporting member having an opening therethru; blade-supporting means carried by said member; a cover hingedly mounted adjacent and spaced rearwardly of the main body of the top of said member so as to overlie the blade-supporting means; an operating lever extending thru the opening of said supporting member and integrally and substantially non-yieldably connected to said cover at its upper end to give a mechanical advantage to said lever relative to said cover; and lever engaging means carried by the upright member adjacent the lower end of the lever, whereby the cover and blade-supporting means may be held by means of said lever against opposing faces of a blade, the lower end of said lever carrying resilient engaging means and said upright member being additionally apertured adjacent said engaging means so as to receive the same therethru and a swingable guard secured to said upright member adjacent the aperture and disposed to overlie the resilient engaging means inserted therethru so as to protect the same against accidental displacement, the guard being laterally displaceable from such overlying position to permit ejection of the engaging means from the aperture.

9. A shaving head comprising in combination: an upright supporting member having an opening therethru; blade-supporting means carried by said member; a cover hingedly mounted adjacent and spaced rearwardly of the main body of the top of said member so as to overlie the blade-supporting means; an operating lever extending thru the opening of said supporting member and integrally and substantially non-yieldably connected to said cover at its upper end to give a mechanical advantage to said lever relative to said cover; and lever engaging means carried by the upright member adjacent the lower end of the lever, whereby the cover and blade-supporting means may be held by means of said lever against opposing faces of a blade, the lower end of said lever being provided with an engaging hook and said upright member being additionally apertured adjacent said hook so as to permit insertion of the hook therethru, and a rotatable guard carried by said upright member so as to overlie the aperture and having an arcuate finger disposed upon rotation of the guard to engage said lever hook in locking relation.

References Cited in the file of this patent

UNITED STATES PATENTS

| Number | Name | Date |
|---|---|---|
| 1,088,873 | Boyler | Mar. 3, 1914 |
| 1,146,869 | Groschopp | July 20, 1915 |
| 1,455,725 | Hartman | May 15, 1923 |
| 1,552,234 | Roebuck | Sept. 1, 1925 |
| 1,960,684 | Taylor | May 29, 1934 |
| 2,030,703 | Kuhnl | Feb. 11, 1936 |
| 2,205,568 | Kuhnl | June 25, 1940 |
| 2,463,682 | Doniger | Mar. 8, 1949 |

FOREIGN PATENTS

| Number | Country | Date |
|---|---|---|
| 352,492 | Germany | Apr. 29, 1922 |
| 734,928 | France | Oct. 31, 1932 |